United States Patent
Berretta et al.

(10) Patent No.: US 9,379,926 B2
(45) Date of Patent: Jun. 28, 2016

(54) MODULATION TECHNIQUE FOR TRANSMITTING AND RECEIVING RADIO VORTICES

(71) Applicant: EUTELSAT S A, Paris (FR)

(72) Inventors: Giuliano Berretta, Paris (FR); Jacques Dutronc, Paris (FR)

(73) Assignee: EUTELSAT S A, Paris (FR)

( * ) Notice: Subject to any disclaimer, the term of this patent is extended or adjusted under 35 U.S.C. 154(b) by 0 days.

(21) Appl. No.: 14/416,664

(22) PCT Filed: Nov. 28, 2012

(86) PCT No.: PCT/IB2012/056804
§ 371 (c)(1),
(2) Date: Jan. 23, 2015

(87) PCT Pub. No.: WO2014/016655
PCT Pub. Date: Jan. 30, 2014

(65) Prior Publication Data
US 2015/0146815 A1 May 28, 2015

(30) Foreign Application Priority Data
Jul. 24, 2012 (EP) ..................................... 12177736

(51) Int. Cl.
*H04L 5/12* (2006.01)
*H04L 23/02* (2006.01)
(Continued)

(52) U.S. Cl.
CPC . *H04L 27/18* (2013.01); *H04L 5/04* (2013.01)

(58) Field of Classification Search
CPC ....... H04L 1/0618; H04L 1/06; H04L 1/0071; H04L 25/0204; H04L 27/368; H04L 25/03343; H04L 7/042; H04L 27/2662; H04L 27/2647; H04B 7/0669; H04B 1/7093; H04B 1/707; H04B 1/709; H04B 7/0845; H04B 7/0854; H04B 7/0857; H03F 1/3247; H03F 1/3294; H03F 2201/3233
USPC .................................. 375/259–285, 295–352
See application file for complete search history.

(56) References Cited

U.S. PATENT DOCUMENTS

| | | | |
|---|---|---|---|
| 8,432,884 B1 * | 4/2013 | Ashrafi | H04L 5/04 370/343 |
| 2013/0235885 A1 * | 9/2013 | Chen | H04L 5/0044 370/468 |
| 2014/0205283 A1 * | 7/2014 | Djordjevic | H04B 10/2581 398/44 |

FOREIGN PATENT DOCUMENTS

| | | |
|---|---|---|
| GB | 2 410 130 A | 7/2005 |
| WO | 2012/084039 A1 | 6/2012 |

OTHER PUBLICATIONS

International Search Report issued in International Patent Application No. PCT/IB2012/056804, dated Mar. 4, 2013.
(Continued)

*Primary Examiner* — James M Perez
(74) *Attorney, Agent, or Firm* — Pillsbury Winthrop Shaw Pittman LLP

(57) ABSTRACT

A device for generating Orbital Angular Momentum (OAM) modes for radio communications. The device is designed to receive one or more input digital signals, each of which has a respective sampling period which is a respective multiple of a given sampling period, and occupies a frequency bandwidth which is a respective fraction of a given available frequency bandwidth. The device is operable to apply, to each input digital signal, a respective space modulation associated with a respective OAM mode having a respective topological charge to generate a corresponding digital signal carrying the respective OAM mode. The device is configured to apply, to each input digital signal, the respective space modulation by interpolating said input digital signal and phase-modulating the interpolated input digital signal so as to generate a corresponding phase-modulated digital signal carrying the respective OAM mode, having the given sampling period, and occupying the given available frequency bandwidth.

18 Claims, 10 Drawing Sheets

(51) Int. Cl.
*H04L 27/18* (2006.01)
*H04L 5/04* (2006.01)

(56) References Cited

OTHER PUBLICATIONS

Mohammadi et al., "Orbital Angular Momentum in Radio—A System Study," IEEE Transactions on Antennas and Propagation, IEEE Service Center, vol. 58, No. 2, Feb. 1, 2010, pp. 565-572.

Tamburini et al., "Encoding manu channels in the same frequency through radio Vorticity: first experimental test," arXiv.org, Jul. 12, 2011.

International Preliminary Report on Patentability and the Written Opinion of the International Searching Authority as issued in International Patent Application No. PCT/IB2012/056804, dated Jan. 27, 2015.

* cited by examiner

MODULATION TECHNIQUE FOR TRANSMITTING AND RECEIVING RADIO VORTICES

CROSS REFERENCE TO RELATED APPLICATIONS

This application is the U.S. National Stage of PCT/IB2012/056804, filed Nov. 28, 2012, which in turn claims priority to European Patent Application No. 12177736.1 filed Jul. 24 2012, the entire contents of all applications are incorporated herein by reference in their entireties.

TECHNICAL FIELD OF THE INVENTION

The present invention relates, in general, to the use of Orbital Angular Momentum (OAM) states, or modes, at Radio Frequency (RF) (including frequencies from a few KHz to hundreds of GHz), and, in particular, to the use of an innovative multidimensional space modulation technique for transmitting and/or receiving RF OAM modes, also known as radio vortices.

The present invention can be advantageously exploited, in general, in radio communications, and, in particular, in satellite communications and terrestrial wireless communications, such as the ones based on Long Term Evolution (LTE) standard.

Moreover, the present invention can be also advantageously exploited in radar detection, Synthetic Aperture Radar (SAR) imaging, and in deep space detection and/or imaging for radio astronomy analyses.

BACKGROUND ART

As is known, currently there is a great deal of research activity in the field of optics, based on photons with different OAM states (or modes).

In particular, researchers have discovered that photons can carry both a Spin Angular Momentum (SAM) associated with polarization, and an OAM associated with the phase azimuthal profile orthogonal to the propagation axis.

In detail, in optics, OAM is a component of angular momentum of a light beam that depends on the field spatial distribution, and not on the polarization of the light beam. An example of OAM is the OAM appearing when a paraxial light beam is in a so-called helical (or twisted) mode, namely when its wavefront is shaped as a helix with an optical vortex in the center, at the beam axis. The helical modes are characterized by an integer number m, positive or negative. Said integer m is also called "topological charge" of the optical vortex.

In this connection, FIG. 1 schematically illustrates exemplary OAM modes of a light beam.

In particular, the OAM modes shown in FIG. 1 correspond to five different topological charges, specifically to m=0, ±1, and ±2.

In detail, FIG. 1 shows:
in a first column, beam wavefront shapes for m=0, ±1, ±2;
in a second column, optical phase distributions in beam cross-sections for m=0, ±1, ±2; and,
in a third column, light intensity distributions in beam cross-sections for m=0, ±1, ±2.

As shown in FIG. 1, if m=0, the mode is not helical and the wavefronts are multiple disconnected surfaces, in particular a sequence of parallel planes (from which the name "plane wave"). If |m|≥1, the wavefront is helical with handedness determined by the sign of in, and the beam photons have an OAM state (or mode) of ±m$\hbar$ directed along the beam axis, where $\hbar$ denotes the Dirac constant which, as known, is obtained as $$\hbar = \frac{h}{2\pi},$$

where h denotes the Planck constant.

Different OAM states are mutually orthogonal thereby allowing, in principle, to transmit any number of bits per photon and, thence, to increase transmission capacity.

In consideration of OAM potentialities of increasing transmission capacity and as RF spectrum shortage problem is deeply felt in radio communications sector, recently a lot of experimental studies have been carried out on the use of OAM modes also at RF in order to try to enhance RF spectrum reuse.

In this connection, reference may, for example, be made to:
Mohammadi S. M. et al., "*Orbital Angular Momentum in Radio—A System Study*", IEEE TRANSACTIONS ON ANTENNAS AND PROPAGATION, IEEE SERVICE CENTER, PISCATAWAY, NJ, US, vol. 58, no. 2, 1 Feb. 2010, pages 565-572, which shows that standard antennas arranged in circular arrays can be used to generate RF beams carrying OAM;
Tamburini F. et al., "*Encoding many channels in the same frequency through radio Vorticity: first experimental test*", arXiv.org, 12 Jul. 2011, Ithaca, N.Y., USA, which experimentally shows that it is possible to propagate and use the properties of twisted non-monochromatic incoherent radio waves to simultaneously transmit several radio channels on one and the same frequency by encoding them in different (and, thence, orthogonal) OAM states (even without using polarization or dense coding techniques); and
GB 2 410 130 A, which discloses a planar phased array antenna for transmitting and receiving OAM radio vortex modes, which antenna comprises a circular array of cavity backed axial mode spiral antenna elements whose phase is controlled such that the phase of each antenna element changes sequentially about the array.

From a mathematical perspective, the transmission of an OAM mode (or state) at a single RF (i.e., by using a pure tone) implies that the electrical field on the radiating aperture can be represented as:

$$F(\rho,\phi) = F(\rho)e^{jk\phi},$$

where $\rho$ and $\phi$ are the cylindrical coordinates on the radiating aperture, and k is a positive or negative integer number.

The radiated field can be represented in the far zone as:

$$E(\vartheta, \varphi) = \frac{1}{R} \int \int_S F(\rho, \phi) e^{-j2\pi \frac{\rho}{\lambda} \sin(\vartheta)\cos(\varphi-\phi)} \rho \, d\rho \, d\phi,$$

where $\vartheta$ and $\varphi$ are the spherical coordinates in the far field, R denotes the radius of the sphere centered on the radiating aperture, S denotes the integration surface used on reception side, and $\lambda$ denotes the wavelength used.

As is known, due to intrinsic characteristics of OAM, an OAM mode transmitted at a single RF (i.e., by using a pure tone) is affected by a phase singularity which creates a null at the bore-sight direction, thereby resulting that $$E(0,0)=0.$$

In order for said phase singularity to be compensated, the integration surface S used on reception side should be sized so as to include the crown peak generated by the OAM mode.

In particular, the integration surface S used on reception side should be different for each OAM mode and, considering the sampling theorem applied to the radiating antenna, should have an area given by:

$$\Delta S = \Delta \Omega R^2 = 2\left(\frac{\lambda}{D}R\right)^2,$$

where D denotes the diameter of the radiating antenna.

Therefore, the price to be paid with pure OAM modes transmitted by using pure tones (i.e., single radiofrequencies) is that the dimensions of the equivalent receiving antenna depend on the distance R from, and on the diameter D of, the transmitting antenna. For example, for a transmitting antenna having a diameter D of about 1 m and working at 2.4 GHz, a receiving antenna located at a distance R of about 400 m should be a ring with a diameter of about 55 m. As shown in FIG. 2, by reducing the diameter of the ring-shaped receiving antenna an additional loss of the order of 12 dB at 5.5 m appears.

This solution is impractical for satellite communications, where the aperture efficiency and the size of the antennas are very critical issues. For example, in geostationary-satellite-based communications in Ka band, for a ground antenna having a diameter D of about 9 m, the diameter of the receiving ring on board the geostationary satellite should be of the order of 50 Km, thereby resulting impractical.

Thence, in view of the foregoing, the main criticality in using radio vorticity in practical systems is that the orthogonality between OAM modes depends on the size of antennas, on the distance between the transmitting and receiving antennas, and on the need for the receiving antenna to operate as an interferometer basis (as, for example, disclosed in the aforesaid papers "*Orbital Angular Momentum in Radio—A System Study*" and "*Encoding many channels in the same frequency through radio Vorticity: first experimental test*", and in GB 2 410 130 A). The result of these constraints is that currently known OAM-based radio communication systems are inefficient and unusable for very long distances such as the ones involved in satellite communications.

OBJECT AND SUMMARY OF THE INVENTION

The Applicant has felt the need to tackle RF spectrum shortage problem in satellite communications sector and, thence, has carried out an in-depth study on RF OAM modes in order to develop an innovative technology for transmitting and/or receiving radio vortices, which technology allows to overcome the above-mentioned drawbacks.

Therefore, an object of the present invention is that of providing a technology for transmitting and/or receiving radio vortices, which overcomes, at least in part, the above-mentioned drawbacks.

This and other objects are achieved by the present invention in so far as it relates to transmitting and receiving devices and systems, as defined in the appended claims.

BRIEF DESCRIPTION OF THE DRAWINGS

For a better understanding of the present invention, preferred embodiments, which are intended purely by way of non-limiting example, will now be described with reference to the attached drawings (all not to scale), wherein.

DETAILED DESCRIPTION OF PREFERRED EMBODIMENTS OF THE INVENTION

Figure 1:
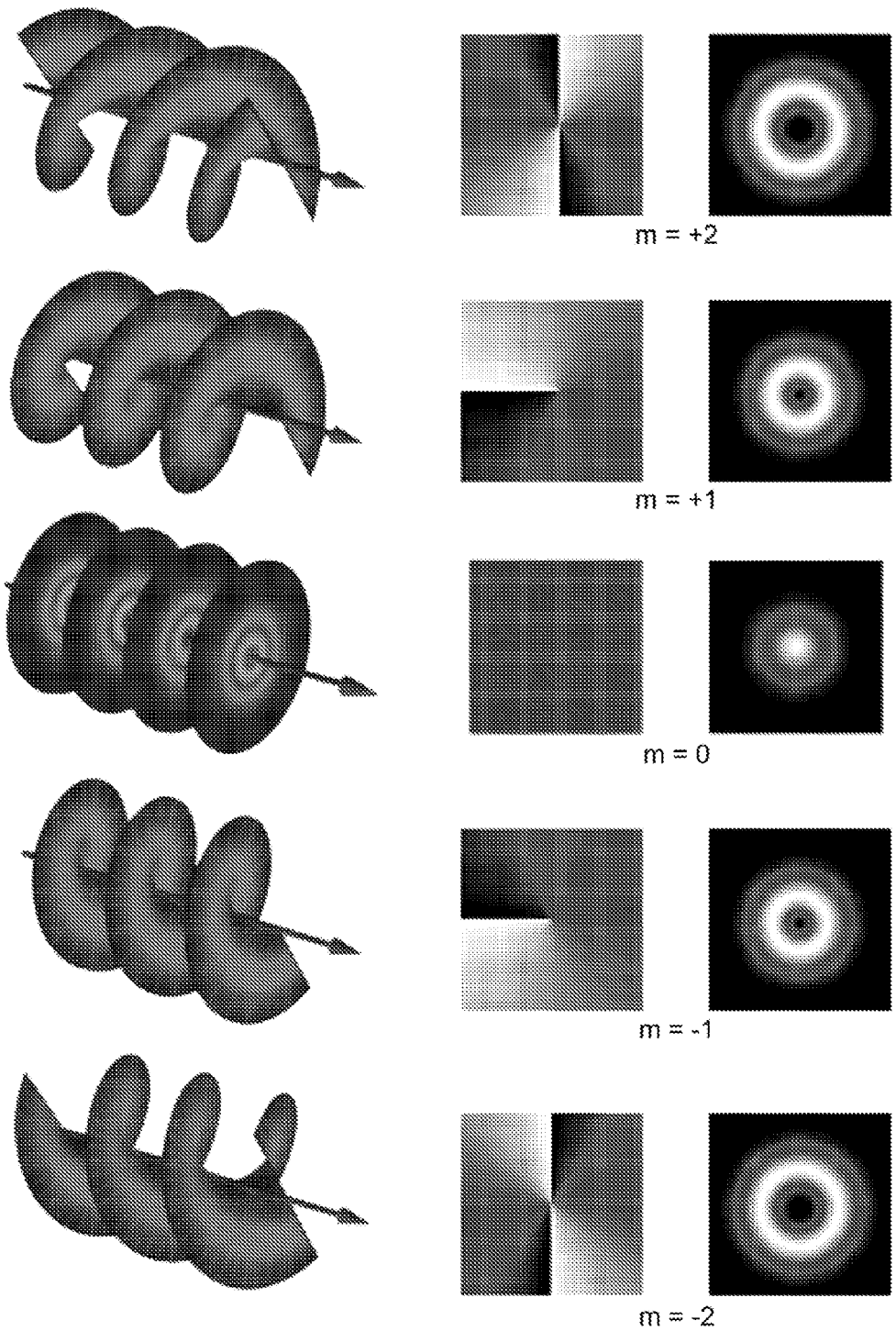
FIG. 1 schematically illustrates OAM states of a light beam.
Figure 2:
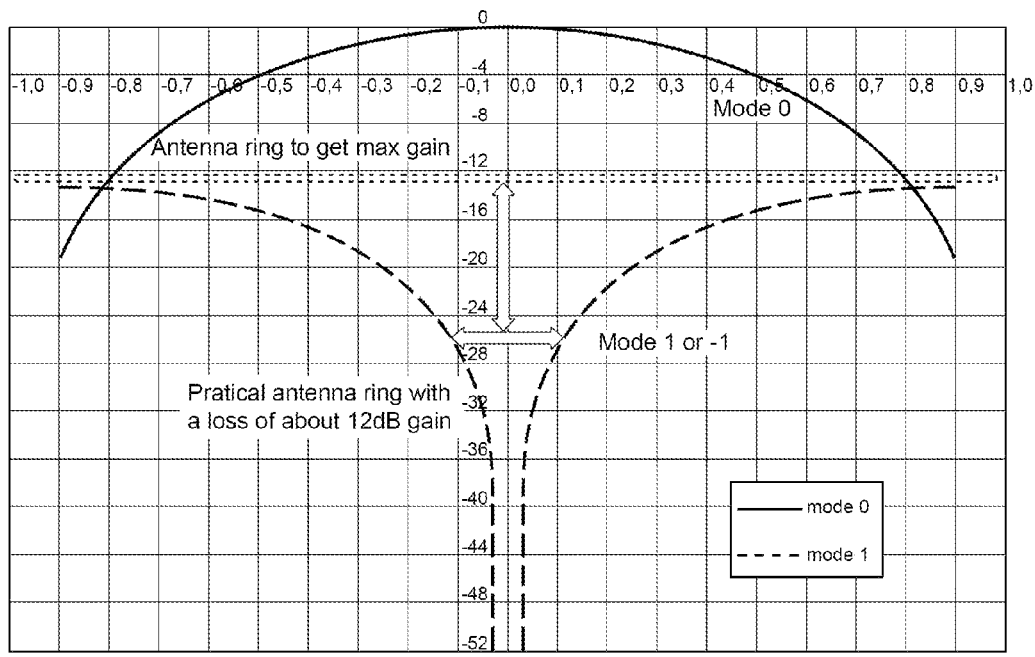
FIG. 2 schematically illustrates effects of RF OAM phase singularity on a receiving antenna.

The following discussion is presented to enable a person skilled in the art to make and use the invention.

Various modifications to the embodiments will be readily apparent to those skilled in the art, without departing from the scope of the present invention as claimed. Thus, the present invention is not intended to be limited to the embodiments shown, but is to be accorded the widest scope consistent with the principles and features disclosed herein and defined in the appended claims.

The present invention stems from Applicant's innovative idea of exploiting a multidimensional space modulation technique, in general, for transmitting and/or receiving radio vortices at frequencies ranging from a few KHz to hundreds of GHz and, in particular, for overcoming the above-mentioned drawbacks thereby allowing the use of radio vortices also for long-distance radio communications, such as satellite communications. Specifically, the multidimensional space modulation technique according to the present invention is used to transmit and/or receive orthogonal RF OAM modes in one and the same direction (i.e., the bore-sight direction) and to solve, at the same time, the problem caused by OAM phase singularity at the bore-sight direction.

As is known, space modulation relates, from a general, conceptual perspective, to methodologies which allow to select the behavior of different directions of the radio environment, combining them in order to get some additional advantage in, and optimization of, signal reception. Radar sector represents a typical application field for space modulation. For instance, a three-dimensional radar is able to simultaneously receive many different directions to optimize target detection and characterization.

Therefore, space modulation techniques are used to create antenna patterns oriented in different directions to simultaneously receive one and the same signal thereby allowing signal reception optimization.

Recently the same technology has been applied to wireless communications (for example to LTE-based communications). In this field, the optimization is performed among signals received by different antennas in order to optimize the energy per bit to noise power spectral density ratio $E_b/N_0$. In wireless communications typical configurations used with space modulation are: Single Input Single Output (SISO), Single Input Multiple Output (SIMO), Multiple Input Single Output (MISO), and Multiple Input Multiple Output (MIMO).

In particular, some known space modulation techniques, such as Information-Guided Channel Hopping (IGCH), Spatial Modulation (SM) and Space Shift Keying (SSK) techniques, are mainly related to communication systems employing multiple antennas, i.e., antenna arrays. The fundamental working principle of said space modulation techniques is that they encode part of the information bits into the spatial position of the used antenna of the array, which, thence, plays the role of a constellation diagram (the so-called "spatial-constellation diagram") for data modulation.

Instead, the innovative modulation according to the present invention doesn't rely on said working principle. In fact, the modulation according to the present invention is actually an innovative phase modulation applied to signals to be transmitted at RF such that to result in orthogonal radio vortices along the bore-sight direction. Therefore, the modulation according to the present invention is called space modulation because it allows to transmit and/or receive orthogonal RF OAM modes in one and the same direction, namely the bore-sight direction. Moreover, the space modulation according to the present invention is called multidimensional because each OAM mode represents a specific space channel along the bore-sight direction, which specific space channel is orthogonal to all the other space channels represented by the other OAM modes.

Figure 3:
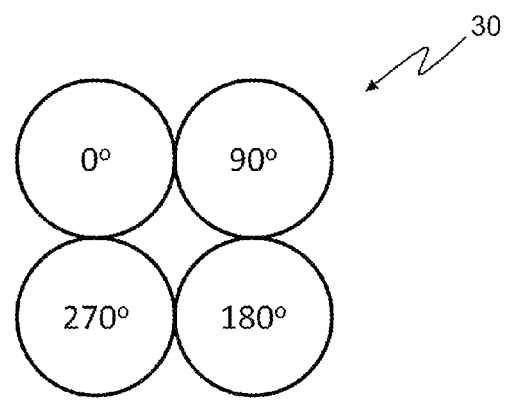
FIG. 3 schematically illustrates phases of radio signals transmitted by an antenna array for generating a twisted RF signal having the OAM mode m=+1.

In order for the present invention to be better understood, reference is made to FIG. 3, which schematically illustrates different phases of four RF signals transmitted by an array 30 of 2×2 transmitting antenna elements (in FIG. 3 schematically represented by circles for the sake of illustration simplicity) for generating a combined twisted RF signal having the OAM mode m=+1.

In particular, as is known, a twisted RF signal having the OAM mode m=+1 is characterized by only one clockwise rotation of 360° of the Poynting vector around the propagation axis (i.e., the bore-sight direction of the array 30) per period T and, thence, it can be generated, as shown in FIG. 3, by transmitting, by means of four ring-arranged transmitting antenna elements, RF signals associated with phases of 0°, 90°, 180°, and 270° clockwise distributed among said four ring-arranged transmitting antenna elements.

Instead, the Applicant has had the intuition that it is possible and convenient, in order to transmit at RF the OAM mode m=+1 and, at the same time, to solve the problem caused by OAM phase singularity at the bore-sight direction, to exploit only one antenna transmitting the four different phases 0°, 90°, 180°, and 270° at different times (or at different frequencies) with a time step of T'=T/4. This possibility increases the efficiency of the transmitting and receiving configuration, which can work regardless of the elementary antenna elements spacing in an antenna array.

Figure 4:
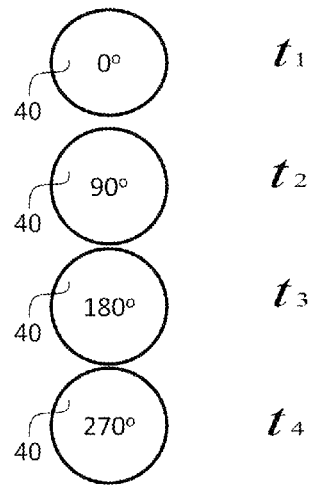
FIG. 4 conceptually illustrates transmission of different phases by means of a single antenna at different times in order to generate a twisted RF signal having the OAM mode m=+1 according to an embodiment of example of the present invention.

In this connection, FIG. 4 conceptually illustrates the transmission of the four different phases 0°, 90°, 180°, and 270° by means of a single antenna 40 (in FIG. 4 schematically represented by a circle for the sake of illustration simplicity) at four different times $t_1$, $t_2$, $t_3$ and $t_4$ with a time step of T'=T/4.

From a conceptual perspective, according to the present invention, in order to manage OAM rotation, namely in order to control speed of rotation of an RF OAM mode about the bore-sight direction, a complementary phase modulation is introduced, which leaves only a residue of the OAM twist and keeps the OAM signature in a limited bandwidth.

In detail, considering the transmission at RF of an OAM mode for which the electrical field on the radiating aperture is $F(\rho,\phi)=F(\rho)e^{-j\phi}$, the radiated field is $$E(\vartheta, \varphi) = \frac{1}{R} \int\!\!\int_S F(\rho)e^{-j\phi} e^{-j2\pi\frac{\rho}{\lambda}sin(\vartheta)cos(\varphi-\phi)} \rho d\rho d\phi,$$

where $e^{-j\phi}$ represents the phase behavior of the transmitted RF OAM mode.

Specifically, the radiated field at the bore-sight direction is $$E(0, 0) = \frac{1}{R} \int\!\!\int_S F(\rho)e^{-j\phi} \rho d\rho d\phi.$$

Considering a modulated electrical field varying with time (t), at the bore-sight direction it results that:

$$E(t) = \frac{1}{R} \int\!\!\int_S s(t)F(\rho)e^{-j\phi} \rho d\rho d\phi = \frac{1}{R} \int\!\!\int_S a(t)e^{j\beta(f)t} F(\rho)e^{-j\phi} \rho d\rho d\phi,$$

$$\text{with } \phi(f) = 2\pi f_0\left(1 + 2\frac{\xi}{f_0}\right)t,$$

where $f_0$ denotes the central carrier RF used.

In order for OAM rotation to be compensated, it should be $\phi=\beta t$, while a residual OAM rotation is kept if $\phi>\beta t$ or $\phi<\beta t$.

If the difference between $\phi$ and $\beta t$ is kept small, it can be written $\phi=4\pi\xi t$, where $\xi=(f-f_0)$, $2\xi_{max}$ represents the occupied bandwidth, and $\beta(f)=2\lambda f_0^2$.

Therefore, it results that the signal $a(t)e^{j4\pi\xi t}$ is an analytical one and has a phase slowly rotating around the bore-sight direction according to the frequency $2\xi_{max}$. This rotation achieved by means of the space modulation allows a signal having a proper bandwidth to be orthogonal to another signal having a different rotation (multiple of the minimum one).

In practical terms, the rotation can be generated by directly rotating the difference between the two phase functions.

If $a(t)=A\cos(2\pi f_0 t)$, the rotation imposed by the space modulation can be arbitrary.

Utilizing the sampling theorem to represent this rotation, at least 3 samples are necessary to reproduce the rotation given by $\xi$.

Figure 5:
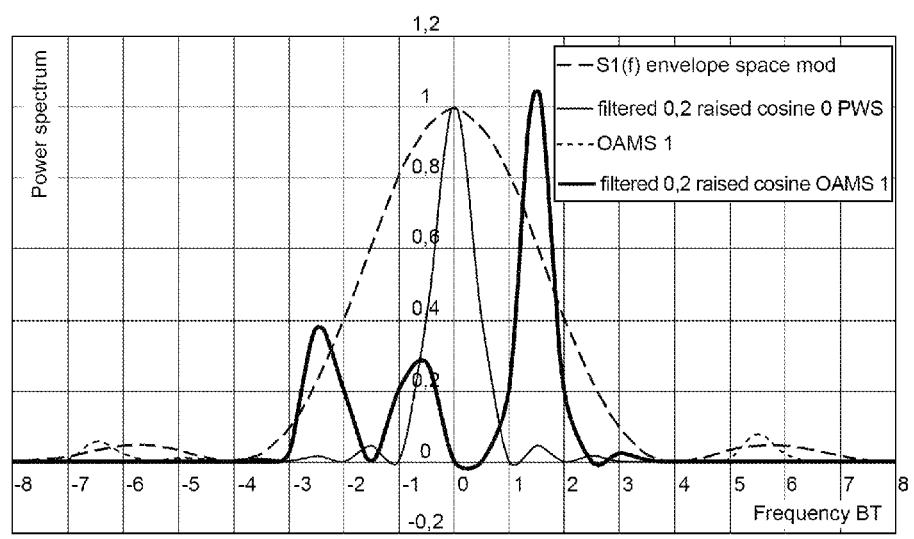
FIG. 5 schematically illustrates a multidimensional space-modulated signal spectrum according to another embodiment of example of the present invention.

In this connection, FIG. 5 schematically shows an example of multidimensional space-modulated signal spectrum for which has been used a sampling set corresponding to the phases:

$$0, \frac{\pi}{2}, \pi, \frac{3}{2}\pi,$$

or, equivalently, $$0, \frac{3}{2}\pi, \pi, \frac{\pi}{2}.$$

Therefore, an RF twisted wave can be transmitted by means of a modulated waveform and can be received by an antenna operating in the complex conjugate mode. The received signal is equal to the transmitted one, apart from standard attenuation and transmission and reception gains in a time period $T_{mod}$.

Figure 6:
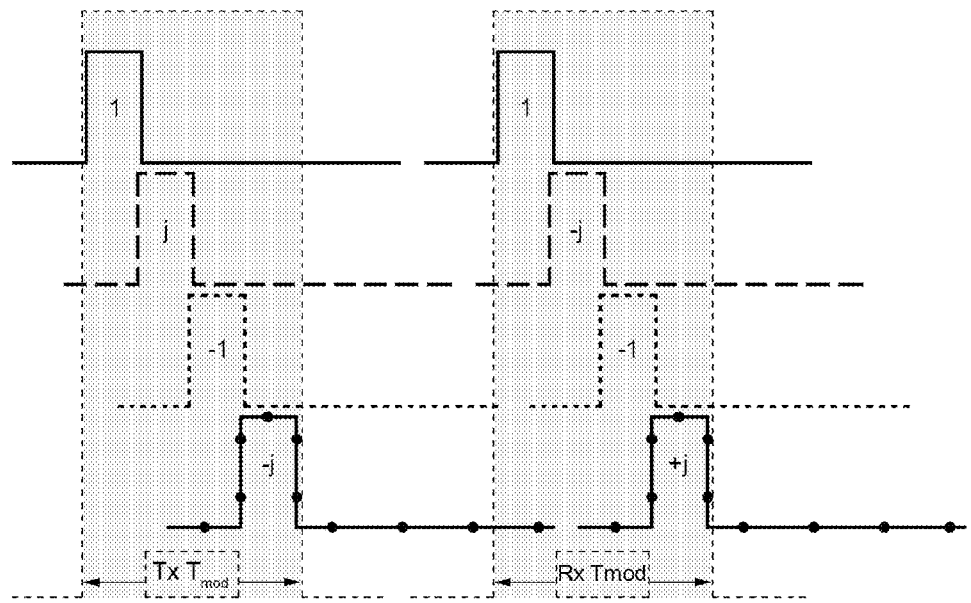
FIG. 6 schematically illustrates native orthogonal signals usable to transmit and to receive at RF the OAM mode m=+1 according to a further embodiment of example of the present invention.

For example, in order to generate the OAM mode m=+1, it is possible to use four native orthogonal signals, each phase-shifted of 90° degrees with respect to the previous one. In this connection, FIG. 6 schematically shows, on the left side, an example of four native orthogonal signals at four different times usable, on transmission side, to generate the OAM mode m=+1, and, on the right side, the corresponding native orthogonal signals (at four different times) to be used to demodulate, on reception side, the transmitted OAM mode m=+1.

The bandwidth increase does not prevent the transmission of plane waves (i.e., the OAM mode m=0), but limits the number of OAM modes at different central frequencies in the available bandwidth.

The present invention allows to utilize a standard antenna in place of a phased array antenna, since the used signals are native orthogonal.

Assuming that the whole available bandwidth is W, that the utilized signal bandwidth is B=W/N, and that there is no technological limitation on adding OAM modes, the frequency reuse factor µ of such a configuration is given by:

$$\mu = 1 + \frac{2}{N} \sum_{m=1}^{int(\frac{N}{3})} int\left(\frac{N}{3m}\right) \approx 1 + \frac{2}{3}\ln(N+1),$$

where int(•) denotes the floor function outputting the integer part of its argument.

It is important to underline the fact that the generation of RF OAM modes by means of the present invention allows to drastically simplify the antenna design. In fact, the antenna does not need to take memory at the period of the carrier frequency of the phase between elements $f_0=1/T_0$. This duty is performed by the sampling frequency of the twisted waves, which is at least 3 times the signal bandwidth; therefore the phase shift assigned to the sampling is already orthogonal in time; it follows that the antenna can be a standard one without the need of using a phased array configuration on either the antenna aperture, or, in case of a reflector antenna, the focal plane.

Therefore, the present invention can be exploited in satellite communications by using already existing satellite and ground antennas.

Figure 7:
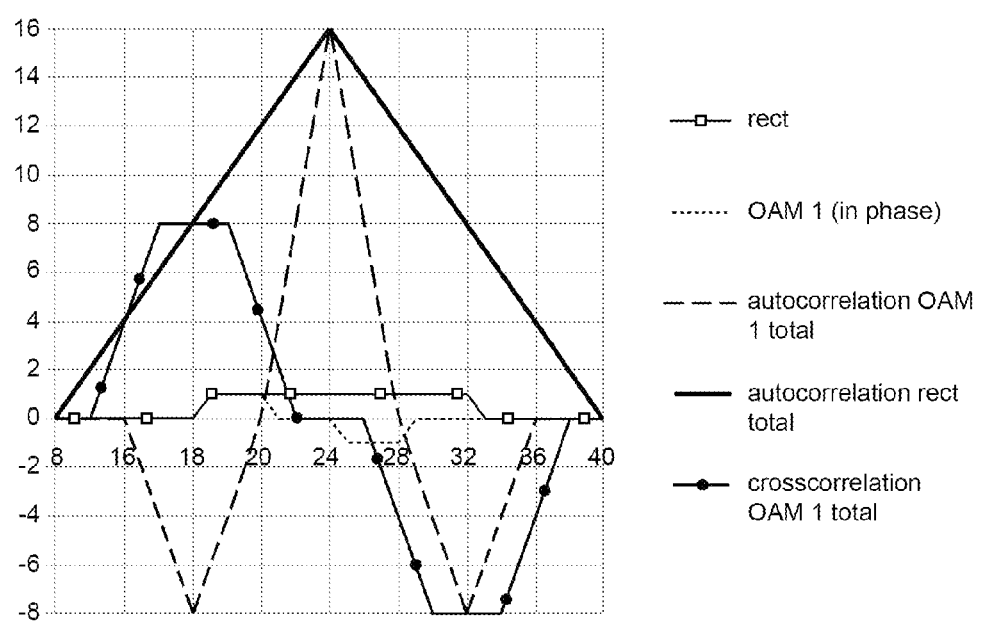
FIGS. 7 and 8 illustrate autocorrelation and cross-correlation functions showing orthogonality characteristics of RF OAM modes generated/received by means of the present invention.

In order to assess orthogonality between a plane wave (i.e., the OAM mode m=0) and a twisted wave (i.e., an OAM mode with topological charge m≠0) generated/received by means of the present invention, FIG. 7 shows:

a first signal representing a plane wave (namely a rect signal);
the autocorrelation function of said first signal;
a second signal representing an RF OAM mode with topological charge m=+1 (or m=−1) generated/received by means of the present invention;
the autocorrelation function of said second signal; and
the cross-correlation function between said first and second signals.

Figure 8:
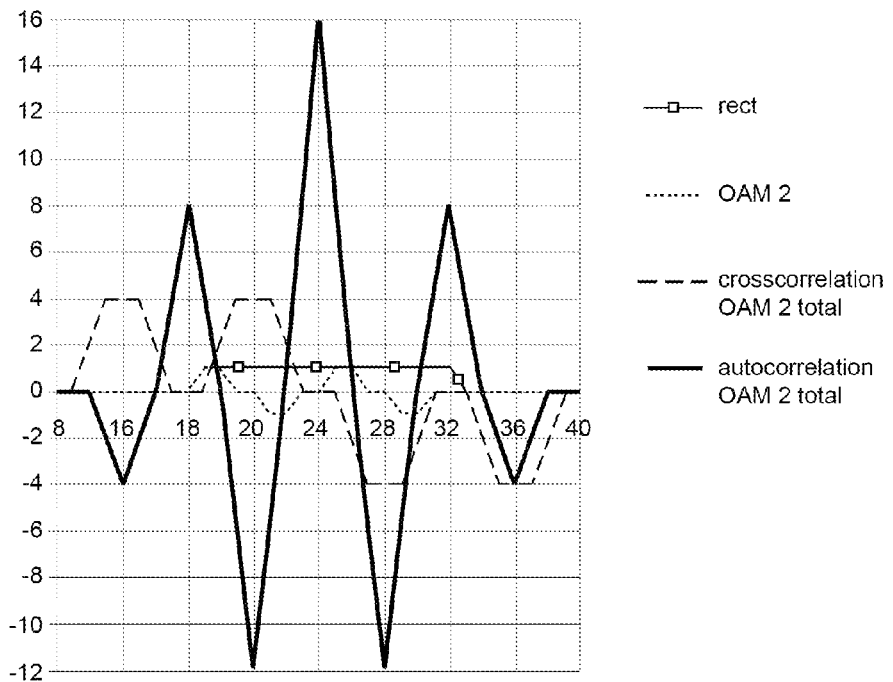

Similarly, FIG. 8 shows:

a first signal representing a plane wave (namely a rect signal);
a second signal representing an RF OAM mode with topological charge m=+2 (or m=−2) generated/received by means of the present invention;
the autocorrelation function of said second signal; and
the cross-correlation function between said first and second signals.

For the sake of illustration clarity, in FIGS. 7 and 8 only the "in-phase" function is shown.

The autocorrelation and cross-correlation functions shown in FIGS. 7 and 8 clearly show that the orthogonality characteristics are fully maintained using the multidimensional space modulation according to the present invention.

An important consideration about the multidimensional space modulation according to the present invention is that each space-modulated signal can have the maximum available bandwidth W, theoretically without any constraint on the space modulation used for each OAM mode, but only with constraints on the linearity of the transmission chain.

For example, in a transponder based on Digital Video Broadcasting-Satellite (DVB-S) standard, a signal to be transmitted by means of a plane wave (i.e., OAM mode m=0) can have the overall transponder bandwidth W and the corresponding plane wave can be transmitted by using a single carrier and occupying the overall transponder bandwidth W. Moreover, also OAM modes m≠0 can be transmitted by occupying the overall transponder bandwidth W, while each signal to be transmitted by means of a respective OAM mode m≠0 can, before the space modulation, either occupy a respective bandwidth equal to W/4|m| (or, at the most, W/3|m|) because of bandwidth increase caused by the space modulation, or be spread on a number of carriers with the other OAM modes.

Figure 9:
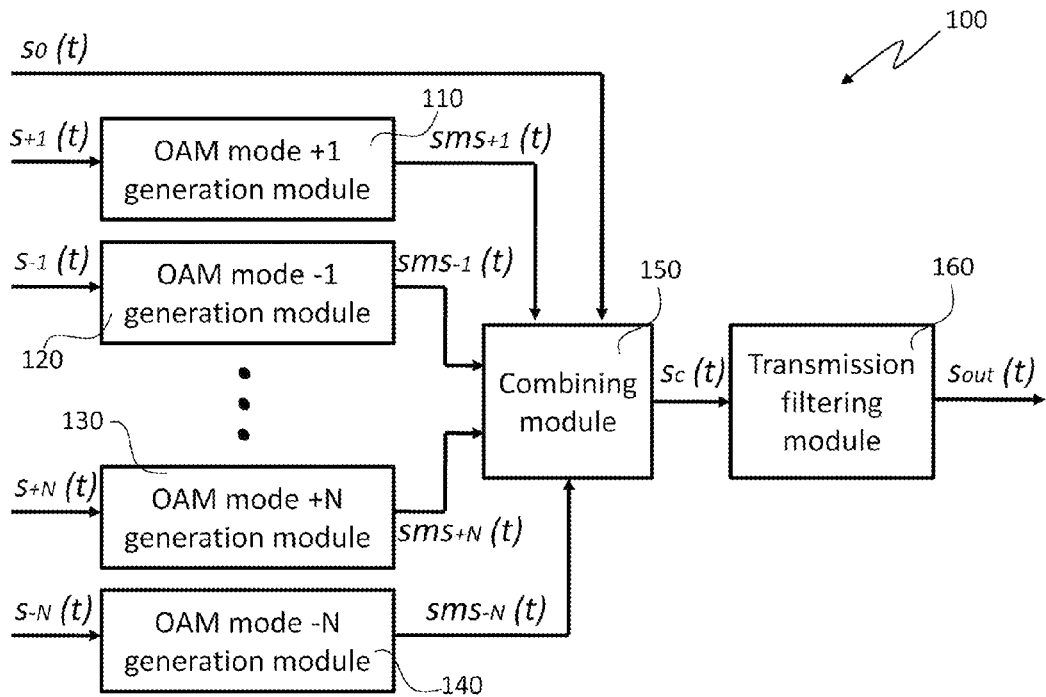
FIG. 9 schematically illustrates a device for generating OAM modes according to a preferred embodiment of the present invention.

In order for the operation of the present invention to be described in deeper detail, reference is made to FIG. 9 which shows a functional block diagram of a device (denoted as whole by 100) for generating OAM modes according to a preferred embodiment of the present invention.

In particular, as shown in FIG. 9, the device 100 is designed to receive:

a first input digital signal $s_0(t)$ carrying an information stream, having a given sampling period $T_0$ and occupying a given frequency bandwidth W centered on a predefined frequency $f_0$; and up to 2N second input digital signals $s_m(t)$, with −N≤m≤S+N and N≥1 (for the sake of illustration simplicity in FIG. 9 only signals $s_{+1}(t)$, $s_{-1}(t)$, $s_{+N}(t)$ and $s_{-N}(t)$ are shown), each carrying a respective information stream, having a respective sampling period $T_m=4|m|T_0$ and occupying a respective frequency bandwidth W/4|m| centered on said predefined frequency $f_0$ (which can, conveniently, be an Intermediate Frequency (IF) thereby resulting that the first and second input digital signals are IF digital signals).

In detail, the device 100 is designed to be coupled with a signal generation section (not shown in FIG. 9 for the sake of illustration simplicity) to receive therefrom the first and second input digital signals.

Figure 10:
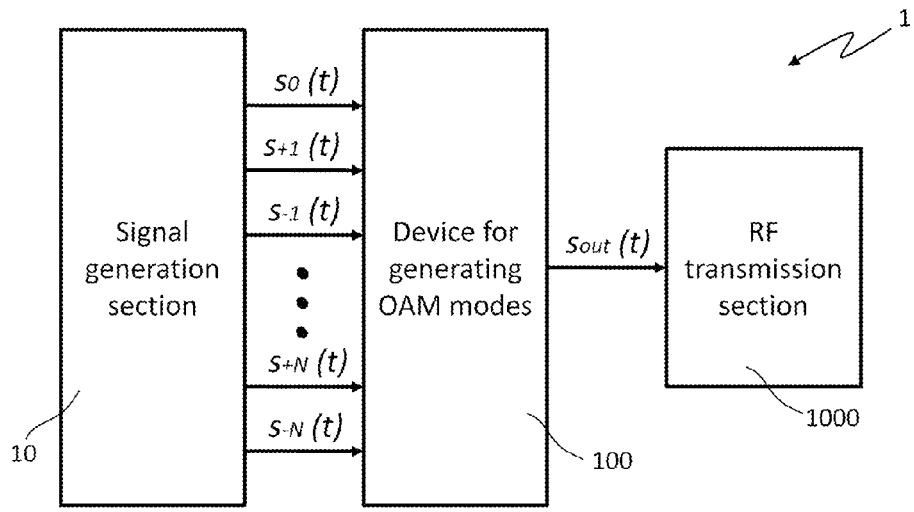
FIG. 10 schematically illustrates a transmitting system comprising the device of FIG. 9.

In this connection, for the sake of completeness of illustration, FIG. 10 shows a functional block diagram of a transmitting system (denoted as whole by 1) comprising a signal generation section 10 and the device 100 coupled with said signal generation section 10 to receive therefrom the first and second input digital signals.

Conveniently, the signal generation section 10 can be designed to generate the first and second input digital signals by performing several operations, such as the following operations (not necessarily all performed and not necessarily performed in the following sequence): information encoding (conveniently by performing one or more signal modulations), one or more frequency shifting operations, sampling (wherein the term "sampling" can conveniently involve analog-to-digital conversion operations), and one or more filtering operations.

Again conveniently, the signal generation section 10 can be a signal generation section of a transmitting system for satellite communications (such as a transmitting system of a feeder link Earth station, of a satellite, or of a ground apparatus for satellite communications), or of a device for wireless communications, such as LTE-based communications.

Moreover, again with reference to FIG. 9, the device 100 comprises 2N OAM mode generation modules. In particular, FIG. 9 shows, for the sake of illustration simplicity, only:
- an OAM mode generation module 110 for generating OAM mode m=+1;
- an OAM mode generation module 120 for generating OAM mode m=−1;
- an OAM mode generation module 130 for generating OAM mode m=+N; and
- an OAM mode generation module 140 for generating OAM mode m=−N.

In detail, a generic OAM mode generation module for generating OAM mode m is operable to apply to a respective second input digital signal $s_m(t)$ a respective space modulation associated with said OAM mode m so as to generate a corresponding space-modulated digital signal $sms_m(t)$ carrying said OAM mode m, having the given sampling period $T_0$, and occupying the whole given frequency bandwidth W centered on said predefined frequency $f_0$.

More in detail, the generic OAM mode generation module for generating the OAM mode m is operable to:
- receive a synchronization signal $synch_m$ (not shown in FIG. 9 for the sake of illustration clarity) indicating the given sampling period $T_0$ and, conveniently, also the sampling period $T_m$ of the respective second input digital signal $s_m(t)$; and
- apply the respective space modulation to said respective second input digital signal $s_m(t)$ by
  - digitally interpolating said respective second input digital signal $s_m(t)$ on the basis of the received synchronization signal $synch_m$ so as to generate a corresponding digitally-interpolated signal having the given sampling period $T_0$;
  - applying to the digitally-interpolated signal a respective digital phase modulation such that to generate a corresponding phase-modulated signal carrying said OAM mode m with a predefined OAM mode rotation speed; and
  - digitally filtering the phase-modulated signal thereby obtaining a filtered signal which represents the aforesaid space-modulated digital signal $sms_m(t)$.

Moreover, again with reference to FIG. 9, the device 100 further comprises:
- a combining module 150 operable to combine the first input digital signal $s_0(t)$ and all the space-modulated digital signals $sms_m(t)$ generated into a corresponding combined digital signal $s_c(t)$; and
- a transmission filtering module 160, which is operable to digitally filter the combined digital signal $s_c(t)$ by means of a predefined transmission filter such that to adjust the signal bandwidth to the bandwidth of transmission radio channel (i.e., the specific radio channel used in transmission) so as to reduce InterSymbol Interference (ISI), thereby obtaining a corresponding output digital signal $s_{out}(t)$; the transmission filtering module 160 being designed to be coupled with an RF transmission section (not shown in FIG. 9 for the sake of illustration simplicity) to provide said RF transmission section with the output digital signal $s_{out}(t)$.

For example, in case of (free-space) satellite communications on a radio channel having the given frequency bandwidth W, the transmission filter can be a predefined root raised cosine filter adapted to said given frequency bandwidth W.

Again with reference to FIG. 10, according to what has been just described, the transmitting system 1 further comprises an RF transmission section 1000 coupled with the device 100 (in particular with the transmission filtering module 160) to receive therefrom the output digital signal $s_{out}(t)$.

Conveniently, the RF transmission section 1000 is designed to transmit at predefined radio frequencies the output digital signal $s_{out}(t)$ received from the device 100 (specifically from the transmission filtering module 160) by means of a single antenna (not shown in FIG. 10 for the sake of illustration simplicity), which can be also a reflector antenna with a single feed, or an antenna array (not shown in FIG. 10 for the sake of illustration simplicity), which can be also a feed array of a multi-feed reflector antenna, thereby transmitting an overall RF signal carrying:
- the first input digital signal $s_0(t)$ by means of a plane wave; and
- the second input digital signals $s_m(t)$, each by means of a respective radio vortex having the corresponding OAM mode m with the predefined speed of rotation about the bore-sight direction.

In particular, said predefined radio frequencies can range from a few KHz to hundreds of GHz depending on the specific application for which the overall transmitting system 1 is designed.

Conveniently, the RF transmission section 1000 can be designed to transmit at the predefined radio frequencies the output digital signal $s_{out}(t)$ by performing several operations, such as the following operations (not necessarily all performed and not necessarily performed in the following sequence): frequency shifting at RF, one or more filtering operations, and power amplification.

Again conveniently, the RF transmission section 1000 can be an RF transmission section of a transmitting system for satellite communications (such as a transmitting system of a feeder link Earth station, of a satellite, or of a ground apparatus for satellite communications), or of a device for wireless communications, such as LTE-based communications.

Figure 11:
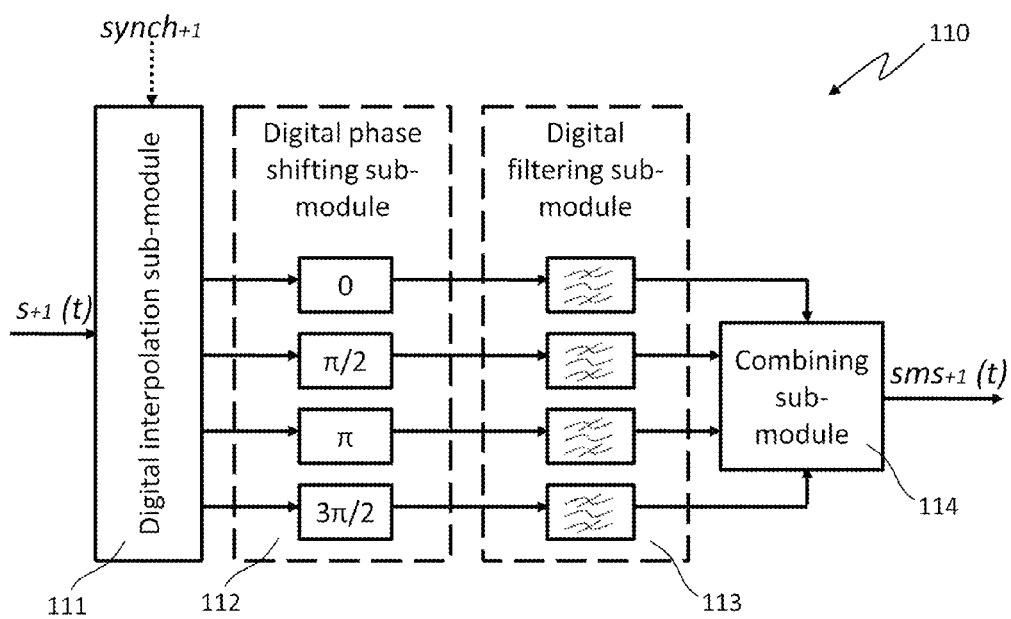
FIGS. 11 and 12 show in deeper detail two modules of the device of FIG. 9.
Figure 12:
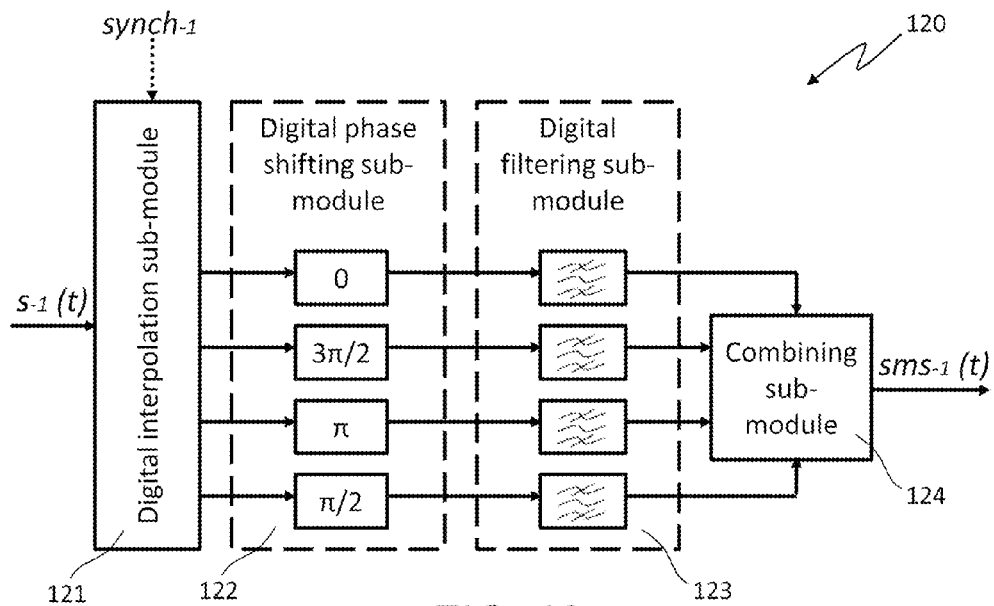

In order for the operation of the OAM mode generation modules to be better understood, reference is made to FIGS. 11 and 12 which show in deeper detail, respectively, the OAM mode generation module 110 for generating the OAM mode m=+1, and the OAM mode generation module 120 for generating the OAM mode m=−1.

In particular, as shown in FIG. 11, the OAM mode generation module 110 comprises:
- a digital interpolation sub-module 111, which is operable to
  - receive the second input digital signal $s_{+1}(t)$ and a synchronization signal $\text{synch}_{+1}$ indicating the given sampling period $T_0$ and, conveniently, also the sampling period $T_{+1}=4T_0$ of the second input digital signal $s_{+1}(t)$, and
  - digitally interpolate the second input digital signal $s_{+1}(t)$ by outputting, for each digital sample of said second input digital signal $s_{+1}(t)$, four corresponding digital samples with time step (i.e., time distance) $T_0$, thereby generating a corresponding digitally-interpolated signal having the given sampling period $T_0$;
- a digital phase shifting sub-module 112, which is operable to apply to each set of four digital samples outputted by the digital interpolation sub-module 111 digital phase shifts related to the OAM mode +1 with the predefined OAM mode rotation speed so as to generate a corresponding set of four phase-shifted digital samples, which corresponding set of four phase-shifted digital samples carries said OAM mode +1 with the predefined OAM mode rotation speed;
- a digital filtering sub-module 113, which is operable to filter each set of four phase-shifted digital samples generated by the digital phase shifting sub-module 112 so as to output a corresponding set of four filtered digital samples; and
- a combining sub-module 114, which is operable to combine the sets of four filtered digital samples outputted by the digital filtering sub-module 113 into a single filtered signal which represents the space-modulated digital signal $sms_{+1}(t)$.

In detail, for each set of four digital samples outputted by the digital interpolation sub-module 111, the digital phase shifting sub-module 112 is operable to apply:
- a digital phase shift related to phase value 0 to the first digital sample of the set;
- a digital phase shift related to phase value $\pi/2$ to the second digital sample of the set;
- a digital phase shift related to phase value $\pi$ to the third digital sample of the set; and
- a digital phase shift related to phase value $3\pi/2$ to the fourth digital sample of the set.

Moreover, as shown in FIG. 12, the OAM mode generation module 120 comprises:
- a digital interpolation sub-module 121, which is operable to
  - receive the second input digital signal $s_{-1}(t)$ and a synchronization signal $\text{synch}_{-1}$ indicating the given sampling period $T_0$ and, conveniently, also the sampling period $T_{-1}=4T_0$ of the second input digital signal $s_{-1}(t)$, and
  - digitally interpolate the second input digital signal $s_{-1}(t)$ by outputting, for each digital sample of said second input digital signal $s_{-1}(t)$, four corresponding digital samples with time step (i.e., time distance) $T_0$, thereby generating a corresponding digitally-interpolated signal having the given sampling period $T_0$;
- a digital phase shifting sub-module 122, which is operable to apply to each set of four digital samples outputted by the digital interpolation sub-module 121 digital phase shifts related to the OAM mode −1 with the predefined OAM mode rotation speed so as to generate a corresponding set of four phase-shifted digital samples, which corresponding set of four phase-shifted digital samples carries said OAM mode −1 with the predefined OAM mode rotation speed;
- a digital filtering sub-module 123, which is operable to filter each set of four phase-shifted digital samples generated by the digital phase shifting sub-module 122 so as to output a corresponding set of four filtered digital samples; and
- a combining sub-module 124, which is operable to combine the sets of four filtered digital samples outputted by the digital filtering sub-module 123 into a single filtered signal which represents the space-modulated digital signal $sms_{-1}(t)$.

In detail, for each set of four digital samples outputted by the digital interpolation sub-module 121, the digital phase shifting sub-module 122 is operable to apply:
- a digital phase shift related to phase value 0 to the first digital sample of the set;
- a digital phase shift related to phase value $3\pi/2$ to the second digital sample of the set;
- a digital phase shift related to phase value $\pi$ to the third digital sample of the set; and
- a digital phase shift related to phase value $\pi/2$ to the fourth digital sample of the set.

The OAM mode generation modules for generating higher-order OAM modes (i.e., with $|m|>1$) operate, mutatis mutandis, conceptually in the same way as the OAM mode generation modules 110 and 120.

Preferably, the device 100 is implemented by means of Field-Programmable Gate Array (FPGA), Application-Specific Integrated Circuit (ASIC), and Software Defined Radio (SDR) technologies.

As previously explained, a signal to be transmitted by means of a plane wave (i.e., the aforesaid first input digital signal $s_0(t)$) can occupy the whole available bandwidth W, while each signal to be transmitted by means of a respective OAM mode $m\neq 0$ (i.e., each of the aforesaid second input digital signals $s_m(t)$) can occupy, before the space modulation, a respective bandwidth equal to $W/3|m|$ or $W/4|m|$. After space modulation, the space-modulated signals have a bandwidth which is conditioned by the number of samples. Therefore, in order to reduce this bandwidth, it is convenient that the signal generation section 10, in use, filters all the sampled signals so as to reduce the side-lobes outside the first one. This reduction is operated to avoid additional ISI between the signal to be transmitted by means of the plane wave (i.e., the aforesaid first input digital signal $s_0(t)$) and the signals to be transmitted by means of OAM modes $m\neq 0$ (i.e., the aforesaid second input digital signals $s_m(t)$).

For example, assuming to transmit RF OAM mode signals up to the $2^{nd}$ order by means of a transponder of 72 MHz, it is important to consider that:
- the overall sampling frequency shall be higher than 144 MHz;
- the bandwidth of signals to be transmitted by means of the OAM mode m=±1 shall be lower than 18 MHz; and
- the bandwidth of signals to be transmitted by means of the OAM mode m=±2 shall be lower than 9 MHz.

Therefore, in use, the signal generation section 10, after the sampling operation, perform a filtering operation so as to eliminate the sampling replica. Once this filtering has been made, the ISI between the signal to be transmitted by means of the plane wave and the signals to be transmitted by means of OAM modes m=±1, ±2 is acceptable and no unwished replica of the digitally-generated signals is present in the wished bandwidth.

The previous considerations are based on the properties of Discrete Fast Fourier Transform (DFFT) and Inverse Discrete Fast Fourier Transform (IDFFT), which are conveniently used to implement the present invention by means of FPGA, ASIC, and SDR technologies.

Figure 13:
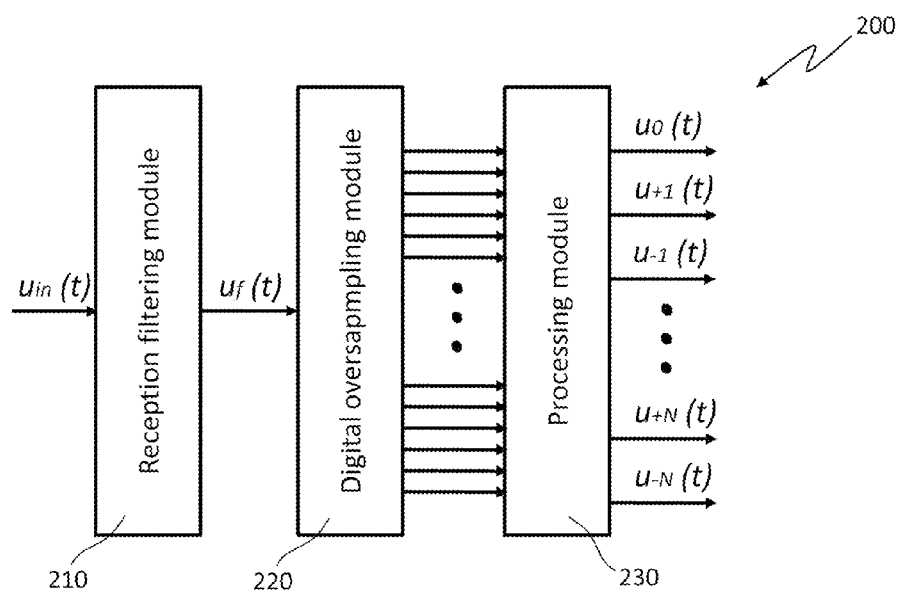
FIG. 13 schematically illustrates a device for demodulating OAM modes according to a preferred embodiment of the present invention.

As for operation of the present invention on reception side, reference is made to FIG. 13 which shows a functional block diagram of a device (denoted as whole by 200) for demodulating OAM modes according to a preferred embodiment of the present invention.

In particular, as shown in FIG. 13, the device 200 is designed to receive an incoming digital signal $u_{in}(t)$.

Specifically, the device 200 is designed to be coupled with an RF reception section (not shown in FIG. 13 for the sake of illustration simplicity) to receive therefrom the incoming digital signal $u_{in}(t)$.

Figure 14:
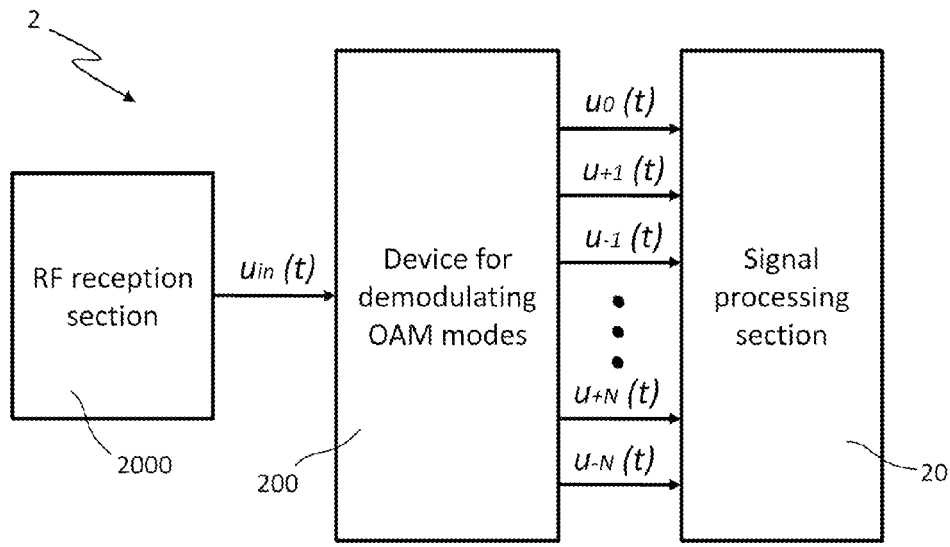
FIG. 14 schematically illustrates a receiving system comprising the device of FIG. 13.

In this connection, for the sake of completeness of illustration, FIG. 14 shows a functional block diagram of a receiving system (denoted as whole by 2) comprising an RF reception section 2000 and the device 200 coupled with said RF reception section 2000 to receive therefrom the incoming digital signal $u_{in}(t)$.

Conveniently, the RF reception section 2000 is designed to receive signals at predefined radio frequencies by means of a single antenna (not shown in FIG. 14 for the sake of illustration simplicity), which can be also a reflector antenna with a single feed, or an antenna array (not shown in FIG. 14 for the sake of illustration simplicity), which can be also a feed array of a multi-feed reflector antenna.

In particular, said predefined radio frequencies can range from a few KHz to hundreds of GHz depending on the specific application for which the overall receiving system 2 is designed.

Conveniently, the RF reception section 2000 can be designed to obtain the incoming digital signal $u_{in}(t)$ by performing several operations upon the received signals, such as the following operations (not necessarily all performed and not necessarily performed in the following sequence): low-noise amplification, one or more frequency shifting operations, one or more filtering operations, and sampling (wherein, as previously said, the term "sampling" can conveniently involve analog-to-digital conversion operations).

Again conveniently, the RF reception section 2000 can be an RF reception section of a receiving system for satellite communications (such as a receiving system of a feeder link Earth station, of a satellite, or of a ground apparatus for satellite communications), of a device for wireless communications (such as LTE-based communications), of a radar system, of a Synthetic Aperture Radar (SAR) system, or of a radio astronomy receiving system.

Moreover, again with reference to FIG. 13, the device 200 comprises a reception filtering module 210, which is operable to digitally filter the incoming digital signal $u_{in}(t)$ by means of a predefined reception filter such that to equalize the incoming digital signal $u_{in}(t)$ with respect to reception radio channel (i.e., the specific radio channel used in reception) and, conveniently, also with respect to transmission filter (i.e., the specific filter used in transmission), thereby obtaining a corresponding filtered incoming digital signal $u_f(t)$.

For example, in case of (free-space) satellite communications on a radio channel having the given frequency bandwidth W, wherein the transmission filter is a predefined root raised cosine filter adapted to said given frequency bandwidth W, the reception filter can be the complex conjugate of said predefined root raised cosine filter so as to reduce ISI.

Additionally, again with reference to FIG. 13, the device 200 further comprises a digital oversampling module 220 operable to digitally oversample the filtered incoming digital signal $u_f(t)$ on the basis of a predefined oversampling period $T_{over}$, thereby outputting a corresponding set of digital samples.

For example, in case the receiving system 2 is configured to receive the RF signals transmitted by the transmission system 1, the predefined oversampling period $T_{over}$ can conveniently be equal to $T_0/Q$, wherein $T_0$ is the given sampling period previously introduced in connection with the device 100, and Q denotes an integer number higher than one.

Furthermore, again with reference to FIG. 13, the device 200 comprises also a processing module 230 configured to:
provide a linear system of M equations (where M denotes an integer number higher than one) relating
the set of digital samples outputted by the digital oversampling module 220
to X unknown digital values (where X denotes an integer number higher than one and lower than M) of useful signals associated, each, with a respective predefined OAM mode m with a predefined OAM mode rotation speed;
wherein said linear system of M equations relates the set of digital samples outputted by the digital oversampling module 220 to the X unknown digital values through
first predefined parameters related to the predefined OAM modes with the predefined OAM mode rotation speed, and
second predefined parameters related to the predefined reception filter, to the reception radio channel and, conveniently, also to the transmission filter;
compute the X digital values by solving the linear system of M equations; and
digitally generate and output the useful signals on the basis of the corresponding digital values computed (in FIG. 12 useful signals $u_0(t)$, $u_{+1}(t)$, $u_{-1}(t)$, $u_{+N}(t)$ and $u_{-N}(t)$ generated and outputted by the processing module 230 are shown).

In this connection, it is important to underline the fact that, in order to extract the useful signals (i.e., in order to solve the linear system of M equations thereby computing the X digital values, and, thence, to generate and output the useful signals), the processing module 230 is conveniently configured to operate as a generalized matched filter which exploits one or more mathematical processing techniques (currently known or future), such as the pseudo-inverse technique.

Moreover, it is also important to underline the fact that the oversampling operation performed by the digital oversampling module 220 allows to increase redundancy of the linear system of M equations (i.e., it allows to obtain a number M of independent equations higher and higher than the number X of the unknown digital values), thereby allowing to find more robust solutions to said linear system of M equations.

Furthermore, the better the characterization of the OAM modes and of the radio channel in the linear system of M equations, the more robust the resolution of said linear system of M equations. Specifically, an increase of the number of first and second predefined parameters used in the linear system of M equations allows to increase redundancy of said linear system of M equations (i.e., it allows to obtain a number M of independent equations higher and higher than the number X of the unknown digital values), thereby allowing to optimize the resolution of, i.e., to find optimum solutions to, said linear system of M equations in terms of energy per bit to noise power spectral density ratio $E_b/N_0$.

In case the receiving system 2 is configured to receive the RF signals transmitted by the transmission system 1, the first predefined parameters are related to the sampling periods $T_0$ and $T_m$ previously introduced in connection with the device 100, and to the digital phase shifts applied by the OAM mode generation modules of the device 100 to the digital samples of the digitally-interpolated signals.

Moreover, again in case the receiving system 2 is configured to receive the RF signals transmitted by the transmission system 1, the useful signals generated and outputted by the processing module 230 (such as the signals $u_0(t)$, $u_{+1}(t)$, $u_{-1}(t)$, $u_{+N}(t)$ and $u_{-N}(t)$ shown in FIG. 13) are the digital signals transmitted by said transmission system 1 by means of a plane wave and a plurality of radio vortices (namely the signals $s_0(t)$, $s_{+1}(t)$, $s_{-1}(t)$, $s_{+N}(t)$ and $s_{-N}(t)$ shown in FIG. 9).

According to a further aspect of the present invention, an overall radio communication system including both the transmission system 1 and the receiving system 2 is preferably designed to:

monitor interference experienced by the radio vortices transmitted; and, if the interference experienced by a radio vortex carrying a given digital signal $s_m(t)$ by means of a given OAM mode m meets a given interference-related condition (for example, if it exceeds a given interference level), start using an OAM mode m* different from the given OAM mode m for transmitting the information stream previously carried by said given digital signal $s_m(t)$ by means of said given OAM mode m, and stop using said given OAM mode m.

In case said further aspect of the present invention is used for satellite communications, it is possible to mitigate jammer, since said further aspect of the present invention allows to reject a jammed OAM mode. Furthermore, said further aspect of the present invention can be used also in combination with other anti-jamming capabilities of the receiving system.

Again with reference to FIG. 14, in use, the device 200 is conveniently coupled with a signal processing section 20 to provide the latter with the useful signals generated and outputted by the processing module 230.

In particular, in case the receiving system 2 is configured to receive the RF signals transmitted by the transmission system 1, the signal processing section 20 can conveniently be designed to process the useful signals generated and outputted by the processing module 230 by performing several operations, such as the following operations (not necessarily all performed and not necessarily performed in the following sequence): digital-to-analog conversion operations, one or more frequency shifting operations, one or more filtering operations, and one or more information decoding operations (conveniently by performing one or more signal demodulations). In detail, the signal processing section 20 can be a signal processing section of a receiving system for satellite communications (such as a receiving system of a feeder link Earth station, of a satellite, or of a ground apparatus for satellite communications), or of a device for wireless communications, such as LTE-based communications.

In case the present invention is used for satellite communications, it results that:

the multidimensional space modulation can be used to generate additional bandwidth at one and the same frequency by using both clockwise and counter-clockwise OAM rotations;

the present invention can be used to either increase the bit rate, or to improve the $E_b/N_0$;

the present invention can be used with existing satellites with the only limitation of using the transponder in the linear portion of the transmission chain (i.e., with a few dBs of Output Back Off (OBO)); and the present invention can be exploited on board next-generation satellites in order to use different OAM modes directed in different downlink directions so as to reduce the number of feeder links, or to increase downlink frequency reuse via space orthogonality.

According to the present invention, the bandwidth increase is balanced by the presence of multiple space channels (i.e., multiple OAM modes). In particular, the bandwidth increases four times for each space channel, but six independent space channels can share the same bandwidth (in this case the frequency reuse µ is 1.5).

When multiple groups of four channels are used, the carrier distance can be reduced to $2/T_{mod}$.

The use of multiple carriers allows to reduce the problem related to power amplifier linearity by reducing the ratio between the peak and the average power (in particular, by a factor 4).

In case the present invention is used for terrestrial LTE-based communications, the OAM modes can be used in combination with clockwise and counter-clockwise OAM rotations. The combined use of clockwise and counter-clockwise OAM rotations creates a redundancy useful for noise protection.

In particular, in case of LTE-based communications, the multidimensional space modulation can be used in addition to the use of Orthogonal Frequency-Division Multiplexing (OFDM), Orthogonal Frequency-Division Multiple Access (OFDMA), Code-Division Multiplexing (CDM) and Code-Division Multiple Access (CDMA). The implication for the use of OAM in combination with OFDM/OFDMA/CDM/CDMA is a potential degradation of orthogonality among the different OAM modes, which may limit the frequency reuse.

Instead, in case the device 200 is used by a radar system, a SAR system, or a radio astronomy receiving system, the signal processing section 20 can conveniently be designed to perform on the basis of the useful signals generated and outputted by the processing module 230, respectively, radar detection, SAR imaging, or deep space detection/imaging for radio astronomy analyses.

In particular, in case the device 200 is used by a radar system, the useful signals are assumed to be modulated by the Doppler frequency shift resulting from a reflection of a plane wave, i.e., an RF pulse signal, transmitted by the radar system and hitting a target. Specifically, the useful signals are assumed to be space-modulated according to the Doppler frequency bandwidth $B_D$ (N times $B_D$ to get up to the OAM mode ±N). As a consequence, the RF nulls are mitigated by the Doppler demodulation technique. This property can be used to increase the radar cross-section and also to obtain target shape coefficients by means of OAM mode analysis.

Mutatis mutandis, the device 200 can be exploited by a SAR system so as to improve SAR imaging of ground moving targets.

Moreover, in case the device 200 is used by a radio astronomy receiving system, the useful signals are assumed to be modulated by the Doppler frequency shift caused by a space body. As in case of radar, the useful signals are assumed to be space-modulated according to the Doppler frequency bandwidth $B_D$ (N times $B_D$ to get up to the OAM mode ±N). As a consequence, the RF nulls are mitigated by the Doppler demodulation technique. This property can be used to increase knowledge of features related to the motion of a space body, such as orbital and rotational features of a space body. In particular, in case of analysis of a natural source of twisted waves, such as a space body (for example a star), there is only one signal which can be analyzed by detecting the different OAM modes.

Preferably, also the device 200 is implemented by means of FPGA, ASIC and SDR technologies.

FIGS. 15-19 schematically show expected performances of the present invention.

Figure 15:
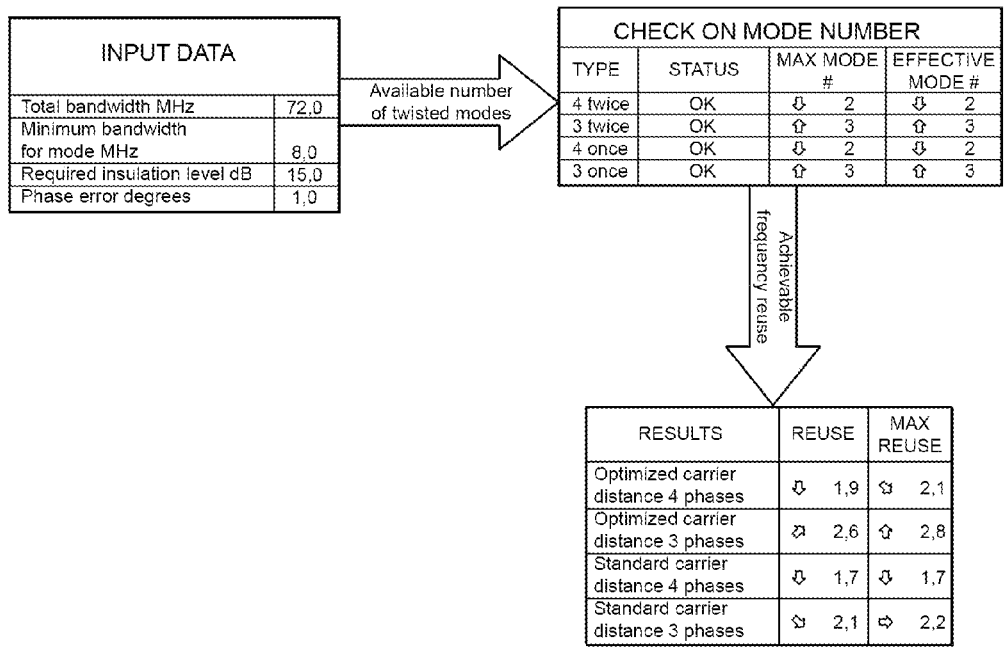
FIGS. 15-19 schematically illustrate expected performances of the present invention.

In particular, FIG. 15 schematically shows expected performances of RF OAM modes generated/received by means of the present invention under the following hypotheses: the whole bandwidth is 72 MHz, the minimum bandwidth for an OAM mode is 8 MHz, the maximum acceptable interference level is lower than −15 dB, and the phase error in OAM mode generation is lower than 1 degree at each step.

As shown in FIG. 15, the number of equivalent 8 MHz channels is:
19 for 3-times rotation;
23 for 3-times rotation using OFDM for higher-order OAM modes; and
15 for 4-times rotation (using or not OFDM).

Figure 16:
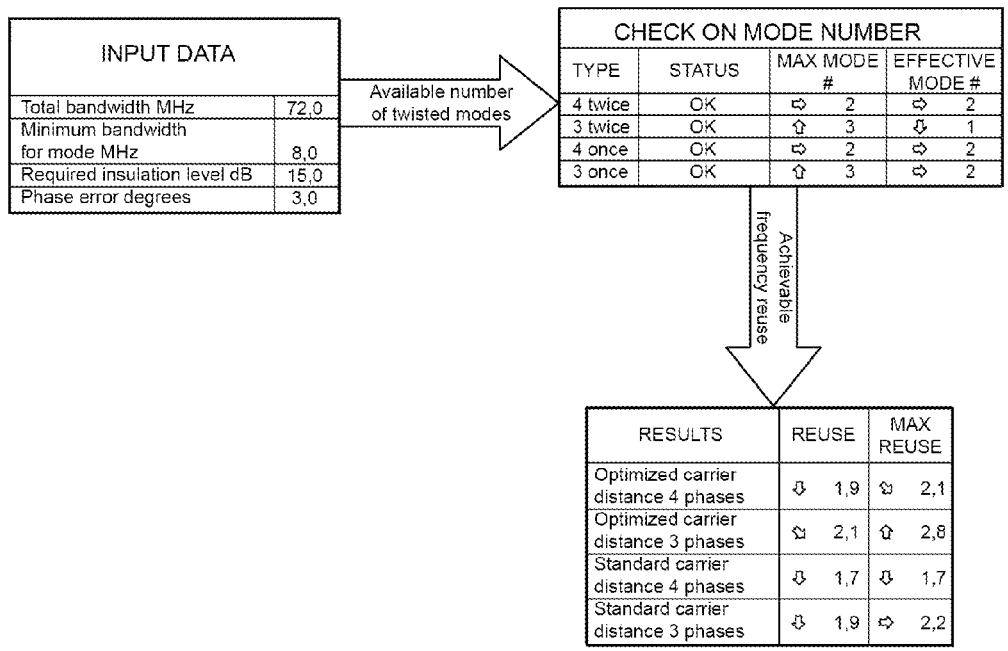

Moreover, FIG. 16 schematically shows expected performances of RF OAM modes generated/received by means of the present invention under the following hypotheses: the whole bandwidth is again 72 MHz, the minimum bandwidth for an OAM mode is again 8 MHz, the maximum acceptable interference level is again lower than −15 dB, while the phase error in OAM mode generation is, in this case, lower than 3 degrees.

As shown in FIG. 16, by assuming a maximum error of 3 degrees and the same interference level, the situation worsens with respect to the case shown in FIG. 15 and may limit the use of additional techniques, such as OFDM. In this case, the frequency reuse advantage ranges from 2.3 to 1.7.

Figure 17:
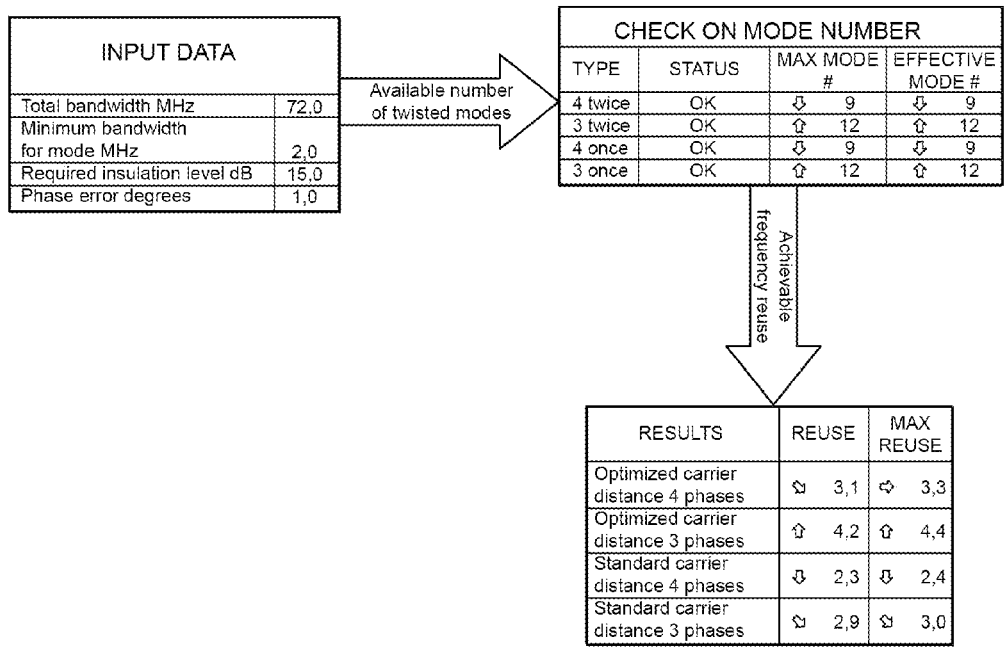

Furthermore, FIG. 17 schematically shows expected performances of RF OAM modes generated/received by means of the present invention under the following hypotheses: the whole bandwidth is again 72 MHz, the minimum bandwidth for an OAM mode is, in this case, 2 MHz, the maximum acceptable interference level is again lower than −15 dB, and the phase error in OAM mode generation is lower than 1 degree.

As shown in FIG. 17, by increasing the number of OAM modes, the advantage increases slowly (following the growth of the function ln(N)). In fact, by assuming a minimum bandwidth for an OAM mode of 2 MHz over the same whole bandwidth of 72 MHz, the maximum number of OAM modes is 12 for 3-times rotation and 9 for 4-times rotation with a total number of equivalent 2 MHz channels of, respectively, 106 (152 using OFDM for higher-order OAM modes) and 85 (119 using OFDM for higher-order OAM modes), and a frequency reuse changing from about 2 to about 4.2-2.3. Therefore, the frequency reuse changing from 9 slots to 36 slots increases by twice, while the equivalent OAM mode number increases by a factor 4.

Figure 18:
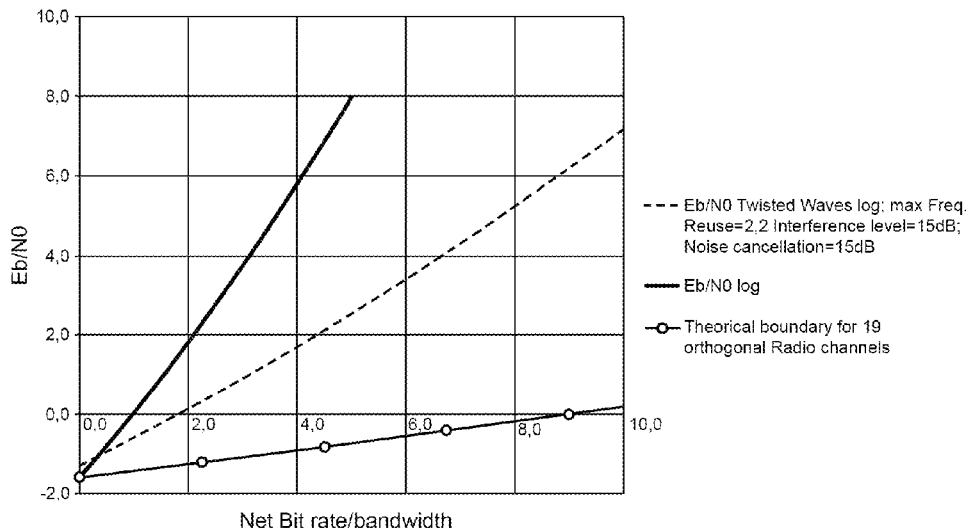

Additionally, FIG. 18 shows a diagram of the energy per bit to noise power spectral density ratio $E_b/N_0$ with respect to the net bit rate to bandwidth ratio in case of five RF OAM modes generated/received by means of the present invention (in particular, for the case shown in FIG. 18, one OAM mode m=0, i.e., one plane wave, six channels for OAM modes m=+1 and m=−1, and two channels for modes m=+2 and m=−2 have been hypothesized). The advantage of using the multidimensional space modulation according to the present invention is evident when looking, in FIG. 18, at the improvement of the net bit rate to bandwidth ratio at the same $E_b/N_0$, or at the advantage of the $E_b/N_0$ at the same net bit rate to bandwidth ratio. In fact, as shown in FIG. 18, by using five RF OAM modes generated/received by means of the present invention, there is either an advantage of about 3 dB for the $E_b/N_0$ at the same net bit rate to bandwidth ratio, or an advantage of more than 2 for the net bit rate to bandwidth ratio at the same $E_b/N_0$.

Figure 19:
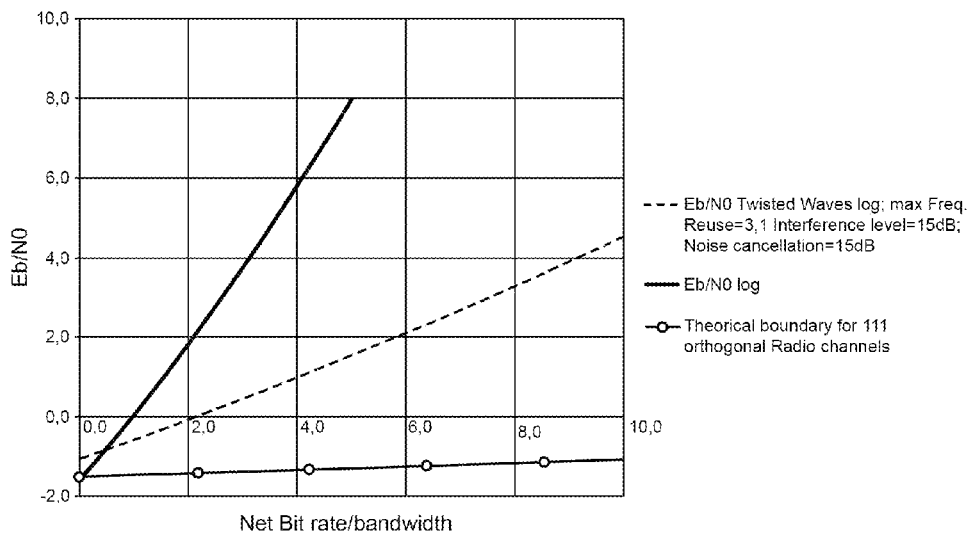

Finally, FIG. 19 shows a diagram of the $E_b/N_0$ with respect to the net bit rate to bandwidth ratio in case of 36 RF OAM modes generated/received by means of the present invention. As shown in FIG. 19, the advantage increases as the number of OAM modes increases. In fact, in case of 36 RF OAM modes, the advantage is of 3.8 dB for the $E_b/N_0$ and of about 3 for the net bit rate to bandwidth ratio.

In summary, the present invention concerns the innovative idea of exploiting a multidimensional space modulation in order to transmit and/or receive radio vortices, i.e., RF OAM modes (or states), and is conveniently implemented by using FPGA, ASIC and SDR technologies.

The multidimensional space modulation allows to control and regulate OAM rotation law in time or in frequency on the azimuthal plane orthogonal to the propagation path, specifically it allows to keep OAM rotation slow with respect to the carrier and larger than the sampling frequency multiplied by 3 or 4 times the mode number.

In this way, the additional encoding introduced by the multidimensional space modulation keeps slow the OAM rotation and allows to avoid the problem caused, on reception side, by OAM phase singularity at the bore-sight direction, thereby allowing the use of radio vortices also for long-distance radio communications, such as satellite communications.

As previously explained, a signal to be transmitted by means of an OAM mode m can occupy any available bandwidth up to the maximum one, which is the whole bandwidth W for mode m=0, i.e., for the plane wave, while, for an OAM mode m with m≠0, is W/3|m| or W/4|m|. Moreover, if 2N+1 OAM modes (comprising the plane wave) are used, the minimum bandwidth for each signal to be transmitted is W/3N or W/4N, which represents the maximum bandwidth for the highest-order OAM modes used ±N.

The present invention allows to introduce additional orthogonal radio channels without the need of using a phased array antenna, and to improve the total information rate for one and the same bandwidth.

The multidimensional space modulation can be also exploited in combination with OFDM, OFDMA, CDM and CDMA.

It's important to underline the fact that the present invention can be exploited for satellite communications by simply equipping Earth stations/terminals with devices configured to implement the multidimensional space modulation by means of FPGA, ASIC and SDR technologies, while it could be already exploited with existing satellite transponders without requiring any hardware modification thereof.

Anyway, in future additional performances can be obtained by equipping next-generation satellite transponders with a dedicated multidimensional space modulation function (keeping the compatibility with the existing standards, such as DVB-S, and without the need of modifying traditional symbol modulation techniques).

From the foregoing, it may be immediately appreciated that the present invention allows to obtain the following advantages:
RF OAM modes can be used independently of the distance between transmitting and receiving antennas and of the antenna sizes;

RF OAM modes can be transmitted/received by means of a standard antenna, without the need of using a dedicated array;

satellite communications in one and the same direction via radio channels based on different RF OAM modes are only slightly affected by atmospheric conditions;

RF OAM modes can be exploited by current satellites; and

RF OAM modes can be used to increase the net bit rate to bandwidth ratio at the same $E_b/N_0$, in accordance with the available power at the transponder level, thereby allowing to offer enhanced services in a very competitive environment.

Moreover, the present invention can be exploited on board next-generation satellites in order to obtain further advantages, such as:

an increase of bit rate per bandwidth or a decrease of needed power for the same bit rate with respect to the current-generation satellites (depending on effective conditions of utilization of the transponders, in fact if a transponder uses a saturated carrier, the advantage could be marginal);

the possibility of using OAM modes to improve cryptography on the link;

the possibility of introducing a jamming protection without the need of using a complex antenna configuration; and an increase of the overall capacity of a satellite payload by improving the frequency reuse; in fact, by exploiting the present invention it is possible to increase spot beam number in downlink without the need of increasing the number of feeder link stations.

Furthermore, the present invention can be exploited also for improving target radar detection, in consideration of the fact that, in radar detection, the signal bandwidth is given by the Doppler frequency shift and that the family of received OAM modes allow to improve detection of the shape of a target "illuminated" by a plane wave. This feature may allow to improve sky control of busy airports, supporting a clearer detection of small aircrafts.

Additionally, the present invention can be exploited also for:

improving SAR imaging of ground moving targets; and increasing, in radio astronomy analyses, knowledge of features related to the motion of a space body.

Finally, it is clear that numerous modifications and variants can be made to the present invention, all falling within the scope of the invention, as defined in the appended claims.

The invention claimed is:

1. Device for generating Orbital Angular Momentum modes for radio communications, the device comprising:

at least one first circuit module configured to receive one or more input digital signals each of which:

has a respective sampling period which is a respective multiple of a given sampling period; and occupies a frequency bandwidth, which is a respective fraction of a given available frequency bandwidth;

the device further comprises second circuit modules configured to:

apply, to each said respective input digital signal, a respective space modulation associated with a respective Orbital Angular Momentum mode having a respective topological charge to generate a corresponding modulated digital signal carrying said respective Orbital Angular Momentum mode;

the respective space modulation comprises interpolating said respective input digital signal and phase-modulating the interpolated input digital signal so as to generate the corresponding phase-modulated digital signal carrying said respective Orbital Angular Momentum mode, having the given sampling period, and occupying the given available frequency bandwidth; and provide an output digital signal based on the modulated digital signal(s) for the radio communications.

2. The device of claim 1, wherein the respective space modulation further comprises:

digitally interpolating said input digital signal thereby generating a corresponding digitally-interpolated signal having the given sampling period; and phase-modulating the corresponding digitally-interpolated signal on the basis of digital phase shifts related to the respective Orbital Angular Momentum mode so as to generate the corresponding phase-modulated digital signal.

3. The device according to claim 1, wherein:

the respective sampling period is equal to the given sampling period multiplied by a respective given factor which is related to the absolute value of the respective topological charge of the respective Orbital Angular Momentum mode; and wherein the frequency bandwidth is equal to the given available frequency bandwidth divided by said respective given factor;

wherein the respective space modulation comprises:

digitally interpolating said input digital signal so as to output, for each digital sample of said input digital signal, a corresponding set of interpolated digital samples with a time step equal to the given sampling period;

wherein each set of interpolated digital samples comprises a number of interpolated digital samples, which number is equal to the respective given factor; and wherein the phase-modulating the digitally-interpolated signal comprises applying, to each set of interpolated digital samples, digital phase shifts related to the respective Orbital Angular Momentum mode, thereby obtaining phase-shifted digital samples;

filtering each set of phase-shifted digital samples; and combining the sets of phase-shifted digital samples into the corresponding phase-modulated digital signal.

4. The device of claim 3, wherein, for each input digital signal, the respective given factor is equal to three or four times the absolute value of the respective topological charge of the respective Orbital Angular Momentum mode.

5. The device according to claim 1, wherein the second circuit modules are further configured to apply the respective space modulation only to one input digital signal, digitally filter the corresponding phase-modulated digital signal by way of a predefined transmission filter such that to adjust the bandwidth of said phase-modulated digital signal to the bandwidth of a given transmission radio channel, thereby obtaining the output digital signal.

6. The device according to claim 1, wherein the second circuit modules are further configured to apply the respective space modulation to a plurality of input digital signals, to combine the corresponding phase-modulated digital signals into a combined digital signal, and digitally filter the combined digital signal by way of a predefined transmission filter to adjust the bandwidth of said combined digital signal to the bandwidth of a given transmission radio channel, thereby obtaining the output digital signal.

7. The device according to claim 1, wherein the at least one first circuit module is further configured to receive a further input digital signal, which:

has the given sampling period; and occupies the given available frequency bandwidth;

wherein the second circuit modules are further configured to:

combine the phase-modulated digital signal(s) and the further input digital signal into a combined digital signal; and digitally filter the combined digital signal by way of a predefined transmission filter such that to adjust the bandwidth of said combined digital signal to the bandwidth of a given transmission radio channel, thereby obtaining the output digital signal.

8. Transmitting system comprising:
the device as recited in claim 1, the transmitting system further comprising;
a signal generation section coupled with said device, and configured to generate, and provide said device with, the input digital signals; and
a transmission section coupled with said device to receive the output digital signal therefrom, and configured to transmit at predefined radio frequencies said output digital signal.

9. The transmitting system of claim 8, wherein the transmission section is configured to transmit at the predefined radio frequencies the output digital signal by way of a single antenna or a reflector antenna with a single feed.

10. The transmitting system of claim 8, wherein the transmission section is configured to transmit at the predefined radio frequencies the output digital signal by way of an antenna array or a multi-feed reflector antenna.

11. The transmitting system according to claim 8, being further configured to transmit one or more information streams, each by using the respective Orbital Angular Momentum mode having the respective topological charge;
wherein the transmitting system is configured to transmit each information stream by operating:
the signal generation section to generate the respective input digital signal carrying said information stream;
the device to generate the corresponding phase-modulated digital signal carrying said respective Orbital Angular Momentum mode, and to provide the output digital signal based on said corresponding phase-modulated digital signal; and
the transmission section to transmit at the predefined radio frequencies the output digital signal;
and wherein the transmitting system is configured to:
receive warning data indicating that interference experienced at the predefined radio frequencies by a specific Orbital Angular Momentum mode meets a given interference-related condition; and,
if it receives the warning data, stop using the specific Orbital Angular Momentum mode and start using a different Orbital Angular Momentum mode for transmitting the respective information stream.

12. Device for demodulating Orbital Angular Momentum modes, receiving an incoming digital signal, and the device comprising circuit modules configured to:
digitally filter the incoming digital signal by way of a predefined reception filter to equalize the incoming digital signal with respect to a given reception radio channel, thereby obtaining a corresponding filtered incoming digital signal;

digitally oversample the filtered incoming digital signal on the basis of a predefined oversampling period, thereby outputting a set of digital samples;

provide a linear system of equations relating the set of digital samples to unknown digital values of useful signals associated, each, with a respective predefined Orbital Angular Momentum mode, said linear system of equations relates the set of digital samples to the unknown digital values through:
first predefined parameters related to the predefined Orbital Angular Momentum modes, and
second predefined parameters related to the predefined reception filter and to the given reception radio channel;

compute the digital values of the useful signals by solving the linear system of equations; and digitally generate and output the useful signals on the basis of the corresponding digital values computed.

13. The device of claim 12, being included in a receiving system configured to receive radio signals transmitted by a transmission system comprising a transmission device for generating Orbital Angular Momentum modes for radio communications; wherein the predefined reception filter is such that to equalize the incoming digital signal also with respect to the predefined transmission filter; and wherein the second predefined parameters are related also to said predefined transmission filter.

14. The device according to claim 12, being included in a receiving system configured to receive radio signals transmitted by a transmission system comprising a transmission device for generating Orbital Angular Momentum modes for radio communications; wherein the predefined oversampling period is equal to a fraction of the given sampling period.

15. The device according to claim 12, being included in a receiving system configured to receive radio signals transmitted by a transmission system comprising a transmission device for generating Orbital Angular Momentum modes for radio communications; wherein the first predefined parameters are related to the given sampling period, the sampling periods of the input digital signals, and the digital phase shifts related to the Orbital Angular Momentum modes.

16. Receiving system comprising:
the device as recited in claim 12;
a reception section, which is coupled with the device, and is configured to receive signals at predefined radio frequencies, to process the received signals so as to obtain the incoming digital signal, and to provide said device with said incoming digital signal; and
a signal processing section coupled with the device to receive the useful signals, and configured to process said useful signals.

17. The receiving system of claim 16, wherein the reception section is configured to receive signals at the predefined radio frequencies by way of a single antenna or a reflector antenna with a single feed.

18. The receiving system of claim 16, wherein the reception section is configured to receive signals at the predefined radio frequencies by way of an antenna array or a multi-feed reflector antenna.

* * * * *